(12) United States Patent
Engle et al.

(10) Patent No.: US 12,603,894 B2
(45) Date of Patent: Apr. 14, 2026

(54) TRUST-BASED VERIFICATION SYSTEM AND METHOD FOR SCALABLE ACCESS CONTROL AND CYBER-SECURITY QUALIFICATIONS

(71) Applicant: WillCo Tech LLC, Akron, OH (US)

(72) Inventors: Marling Engle, Cuyahoga Falls, OH (US); Richard M. Edwards, Akron, OH (US)

(73) Assignee: CYBERSTAR SOFTWARE, LLC, Akron, OH (US)

( * ) Notice: Subject to any disclaimer, the term of this patent is extended or adjusted under 35 U.S.C. 154(b) by 350 days.

(21) Appl. No.: 18/213,426

(22) Filed: Jun. 23, 2023

(65) Prior Publication Data

US 2023/0421572 A1 Dec. 28, 2023

Related U.S. Application Data

(60) Provisional application No. 63/354,869, filed on Jun. 23, 2022.

(51) Int. Cl.
*H04L 9/40* (2022.01)
(52) U.S. Cl.
CPC ................................. *H04L 63/126* (2013.01)
(58) Field of Classification Search
CPC ............................ H04L 63/126; H04L 63/105
See application file for complete search history.

(56) References Cited

U.S. PATENT DOCUMENTS

| | | | | | |
|---|---|---|---|---|---|
| 9,672,336 | B1 * | 6/2017 | Spence | ................... | G06F 21/32 |
| 11,336,632 | B2 * | 5/2022 | Lingampally | ........... | G06F 21/41 |
| 11,630,885 | B2 * | 4/2023 | Hall | ...................... | H04L 63/105 726/6 |
| 11,762,975 | B2 * | 9/2023 | Allen | ...................... | G06N 5/013 |
| 11,789,911 | B1 * | 10/2023 | Surabhi | ................. | G06F 16/256 707/802 |
| 2015/0058931 | A1 * | 2/2015 | Miu | ................... | G06Q 20/4016 707/784 |
| 2015/0074757 | A1 * | 3/2015 | Sharma | ................... | G06F 21/45 726/2 |
| 2015/0254645 | A1 * | 9/2015 | Bondesen | ............ | G06Q 20/385 705/41 |
| 2018/0075229 | A1 * | 3/2018 | Jan | .......................... | G06F 21/35 |
| 2019/0044917 | A1 * | 2/2019 | Mork | ................. | H04L 63/0428 |
| 2020/0045083 | A1 * | 2/2020 | Prasad | ................. | H04L 63/107 |
| 2020/0302049 | A1 * | 9/2020 | Johnson | ................. | G06F 21/45 |

\* cited by examiner

*Primary Examiner* — Phy Anh T Vu

(74) *Attorney, Agent, or Firm* — Wentsler LLC

(57) ABSTRACT

Provided are a platform and a computer-implemented process of controlling access to a restricted resource by verifying qualifications in compliance with a regulatory security framework. A computing system receives a configuration package including a qualification set, a threshold trust for a qualification, a plurality of different sources that could potentially provide information indicative of the qualification, and a different trust level to be assigned to each of the sources. The computing system also receives the information indicative of the qualification from a first source. A first trust level assigned to the first source is compared to the threshold trust associated with the qualification. Responsive to a determination that the first trust level satisfies the trust threshold, the qualification is flagged as being verified without human intervention to control access to the restricted resource.

4 Claims, 3 Drawing Sheets

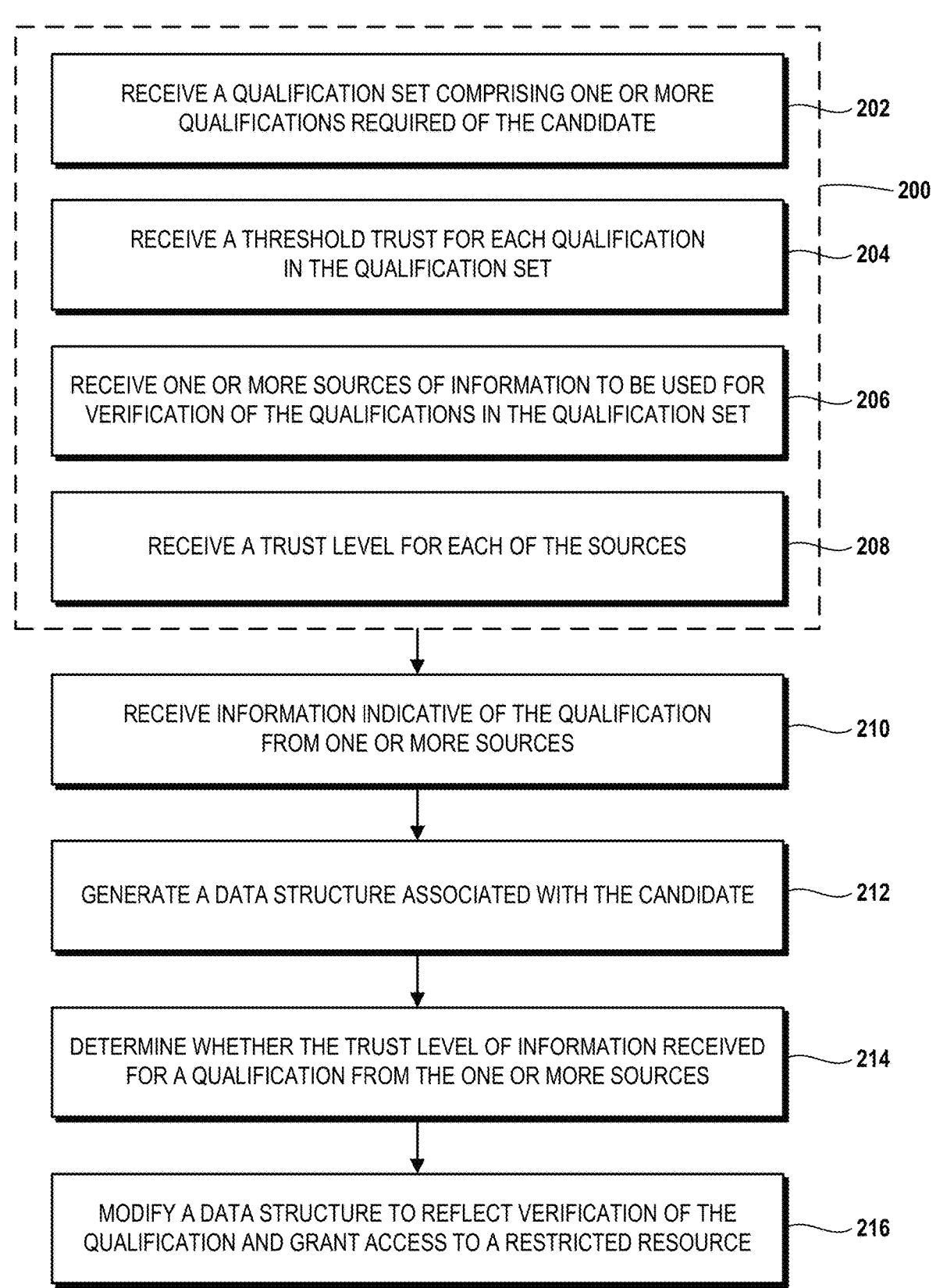

RECEIVE A QUALIFICATION SET COMPRISING ONE OR MORE QUALIFICATIONS REQUIRED OF THE CANDIDATE — 202

200

RECEIVE A THRESHOLD TRUST FOR EACH QUALIFICATION IN THE QUALIFICATION SET — 204

RECEIVE ONE OR MORE SOURCES OF INFORMATION TO BE USED FOR VERIFICATION OF THE QUALIFICATIONS IN THE QUALIFICATION SET — 206

RECEIVE A TRUST LEVEL FOR EACH OF THE SOURCES — 208

RECEIVE INFORMATION INDICATIVE OF THE QUALIFICATION FROM ONE OR MORE SOURCES — 210

GENERATE A DATA STRUCTURE ASSOCIATED WITH THE CANDIDATE — 212

DETERMINE WHETHER THE TRUST LEVEL OF INFORMATION RECEIVED FOR A QUALIFICATION FROM THE ONE OR MORE SOURCES — 214

MODIFY A DATA STRUCTURE TO REFLECT VERIFICATION OF THE QUALIFICATION AND GRANT ACCESS TO A RESTRICTED RESOURCE — 216

TRUST-BASED VERIFICATION SYSTEM AND METHOD FOR SCALABLE ACCESS CONTROL AND CYBER-SECURITY QUALIFICATIONS

BACKGROUND OF THE INVENTION

1. Field of the Invention

This application relates generally to a method and system for verifying qualifications to control access to a restricted resource and, more specifically, to a scalable method and system that is user configurable to establish qualifications required of candidates under consideration for access to resources and the trust level required for verification of those qualifications.

2. Description of Related Art

Compliance with cybersecurity-related regulatory frameworks requires verification of trusted, sensitive qualifications to gain access to restricted resources. For example, candidates may apply for a position within a governmental agency where they will have access to a restricted resource such as a highly-sensitive database with classified information. Another candidate may seek access to enter a restricted facility such as a shipping port or other facility where goods are imported to, and exported from a country. Researchers may apply for a position in which they will require access to a medical lab where sensitive research projects are being conducted and/or potentially-hazardous or rare materials are located. Candidates for promotion within a military or law-enforcement unit may seek access to clandestine and/or deadly operational equipment and information.

Depending on the resources (e.g., restricted computer networks, information, facilities, weaponry, materials, etc.) to which successful candidates will be granted access, the candidates will often be required to possess a unique list of qualifications. For example, as a condition of being granted access to such restricted resources, successful candidates may be required to possess one or more certifications, licenses, degrees, and/or other such qualifications that are indicative of the candidate's security clearance, skills, background etc. pertinent to accessing and using the restricted resources.

Network-accessible submission platforms have traditionally allowed candidates to manually upload documents or information as proof of their qualifications. Personnel managers would then proceed to verify the authenticity of certain documents that were submitted. However, it is not always practical or possible to verify certain documents, so those documents are often taken at face value as being true and accurate. Further, computer graphics editors have made it possible to falsify or otherwise manipulate documents in a way that may convince personnel managers to wrongfully conclude that a candidate has a qualification based on a falsified document.

More recently submissions platforms have been interfaced with digital sources of content, to extract qualification information about candidates from those digital sources. For example, a submission platform can be interfaced to receive candidate information from a website such as LinkedIn or Facebook, allowing an educational history of the candidate to be pulled and transmitted to the submission platform. However, the information on such digital sources is maintained by the candidates themselves, which is susceptible to being falsified or exaggerated, which limits the trustworthiness of that information.

Background checks can be performed by agencies such as local, state and national governments, credit reporting services, etc. The information from such agencies is typically trustworthy, and a true and accurate reflection of candidates. But interfacing with such services has traditionally involved a static verification platform setup to receive information from a fixed set of sources. However, static platforms are unsuitable because no single verification platform fits a variety of different verification frameworks. Different verification frameworks may seek different information, from different sources having different levels of trustworthiness, for candidates seeking different roles.

Bespoke verification systems that can be tailored to specific verification frameworks are cost prohibitive, and require constant maintenance and updates from dedicated developers at the program code level to maintain connections with online sources. For example, bespoke verification systems can be configured specifically to communicate with a specific agency to receive background check information. Once such bespoke systems are set up, they are not readily adaptable to reflect changes to policies for interfacing with such agencies, or to communicate with different network-accessible assets as they are deployed. Further, background checks by law enforcement, for example, are but one portion of information considered under a cybersecurity-related regulatory framework, and may not be required of certain candidates who would not be granted access to high-security resources. And cybersecurity-related regulatory frameworks themselves may evolve over time, requiring a changing set of qualifications to be verified, for different roles. Adapting a bespoke system to account for such changes requires development at the source code level of the bespoke system, which is expensive, time consuming and impractical for systems that may be used to vet a variety of different candidates, each with differing qualifications.

Thus, such frameworks are inadequate for verifying information or qualifications of large populations of unique individuals in a way that is both accurate and trustworthy for diverse work roles, positions within an organization, security clearances, degrees, on-the-job training, continuing education requirements, skillsets, etc. Further, cybersecurity-related regulatory frameworks that require qualifications from each individual or role, across large populations, in large organizations, also makes manual verification processes prohibitively expensive and inaccurate, forcing blind reliance on candidate-submitted information, which does not meet the needs of regulatory adherence.

BRIEF SUMMARY OF THE INVENTION

Accordingly, there is a need in the art for a scalable apparatus, process and system for verifying qualifications of one or more candidates in compliance with a regulatory security framework. Such technology can optionally be automated, allowing verification to occur without manual user intervention once the apparatus and system are configured, and can optionally designate any qualifications that are not automatically verifiable for follow up by an authorized user.

According to one aspect, the subject application involves a computer-implemented process of controlling access to a restricted resource by verifying qualifications in compliance with a regulatory security framework. The computer-based process includes receiving, with a computing system, a configuration package. The configuration package includes: (i) a qualification set comprising a qualification requested of a candidate to gain access to the restricted resource; (ii) a threshold trust for the qualification that is to be established for the qualification to be considered verified; (iii) a plurality of different sources that could potentially provide information indicative of the qualification, and (iv) a different trust level to be assigned to each of the sources, wherein trust level establishes a degree to which the respective source is considered trustworthy. The computing system receives the information indicative of the qualification from a first source included in the plurality of different sources, and generates, a data structure associated with the candidate comprising the information received from the first source. The computing system compares a first trust level assigned to the first source to the threshold trust associated with the qualification. Responsive to a determination that the first trust level satisfies the trust threshold, the computing system modifies the data structure to flag the qualification as being verified without human intervention. The computing system controls access to the restricted resource based, at least in part, on the qualification being flagged in the data structure.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein:

FIG. 2 is a flow diagram schematically depicting a process of controlling access to a restricted resource by verifying qualifications in compliance with a regulatory security framework.

DETAILED DESCRIPTION OF THE INVENTION

Figure 1:
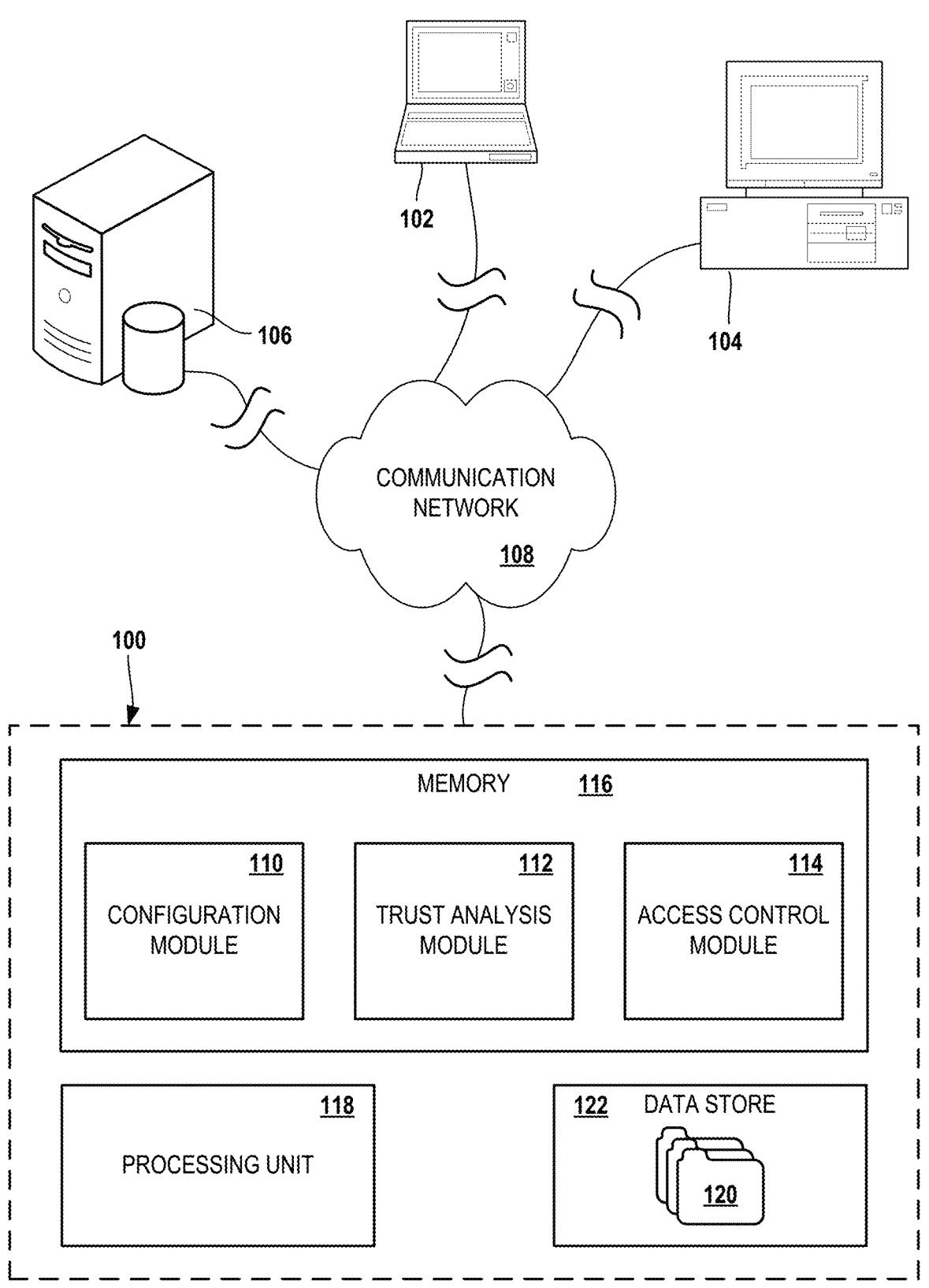
FIG. 1 is a block diagram of a computing system for controlling access to a restricted resource by verifying qualifications in compliance with a regulatory security framework.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

The present technology escalates through available qualification verification mechanisms to establish at least a minimum level of trust in one or more qualifications of a candidate required for a role. The present technology is also scalable by limiting human intervention when trustworthy sources are able to establish a threshold trust level and thereby verify one or more qualifications, and control access to a restricted resource without human intervention.

According to some embodiments, different possible sources of information verifying one or more qualifications is assigned a level of trust, optionally as an organizational policy decision. Accordingly, the organization can configure the present platform for verifying one or more qualifications of candidates based on a specific role within an organization, the nature of the qualification(s) being verified, and the source supplying the information used for verifying the qualification(s). Because trust levels can be assigned as organizational policy decisions, the present platform is user configurable through the input of user selections, without requiring a bespoke development at the source code level.

According to some embodiments, each type of verification process can be assigned a level of trust, and can be flagged as automated or not. A minimum trust level can be established for each qualification to be verified, and each source assigned a trust level indicative of whether the source supplies information that is maintained independently of the candidate, or whether the candidate has the ability to manipulate the information from the source. For example, a threshold trust can be established for the qualification. If the threshold trust is exceeded by the actual trust afforded information indicative of the qualification supplied by a trustworthy source, the qualification is considered verified.

If not, the qualification can be flagged as unverified without additional information, possibly from a different source. Additional information indicative of the qualification from a second source, whether more or less trustworthy than the first source, can be received and considered. If the combined trust level determined by adding the trust level assigned to the second source and the first trust level assigned to the first source exceeds the threshold trust, then the qualification can be considered verified. The second source can involve the candidate, or manual verification by a party affiliated with the organization seeking to verify the qualification. If the threshold trust is still not exceeded by the sum of trust levels assigned to the first and second sources, the qualification can be designated as unverified.

Accordingly, candidates having qualifications that can be automatically verified with information from trustworthy sources can be granted access to restricted resources, optionally in a role, position, or other opportunity, without human intervention, making the present technology scalable. For example, candidates with verified qualifications can be granted secure access to a network resource (e.g., data server, encrypted database, processing units, etc.), physical access to a facility, etc.

Further, the present technology is user configurable (e.g., without modification of the program code). Organizations can specify the configuration package, including at least one, a plurality of, or all of: the qualifications to be verified, the threshold trust for each qualification, the sources that can potentially provide information used to verify the qualifications, and a trust level associated with each source.

With reference to the drawings, FIG. 1 illustrates one embodiment of a computing system 100 related to verification of qualifications of candidates for access to a restricted resource. In one embodiment, the computing system 100 is implemented as a computer 300 described in detail below with respect to FIG. 3. According to another embodiment, the computing system 100 is a computing/data processing system including an application or collection of distributed applications for enterprise organizations. The applications and computing system 100 may be configured to operate with, or be implemented as a cloud-based networking system, a software as a service (SaaS) architecture, a node in a cluster computing system or another type of networked computing solution. In one embodiment, the computing system 100 is a centralized server-side application that provides at least the computerized functions disclosed herein and that electronically communicates with a plurality of nodes (e.g., remote terminals 102, 104, database server 106 or other network-accessible storage devices, etc.) over a computer communications network 108. The computing system 100 and one or more of the remote terminals 102, 104 and/or database server 106 can optionally operate together to store and process data as described herein. The computing system 100, in one embodiment, can be a master node that controls other nodes (e.g., remote terminals 102, 104 and/or database server 106) of the distributed file system.

According to other embodiments, one or more of the components of the computing system 100 can be embodied as program modules (configuration module 110, trust analysis module 112, access control module 114) stored in a memory 116 of the computing system 100. The program modules are configured with instructions that, when executed by at least a processor 118, cause the computing system 100 to perform the corresponding function(s). For the sake of brevity and clarity, however, the program modules are described herein stored in the memory of the computing system 100. Data structures 120 generated and modified as described herein can be stored locally in a data store 122 maintained by the computing system 100.

As described in greater detail with reference to FIG. 3, the processing unit 118 can be, for example, one or more hardware processors, such as, a microprocessor, central processing unit (CPU), application-specific integrated circuit (ASIC), or similar hardware device, or array thereof. The processing unit 118 is connected via circuitry (e.g., a bus) to the memory 116 and to the data store 122 via one or more input/output controllers. The memory 130 is, for example, a non-transitory memory such as a cache memory of a processor, a flash memory, a random-access memory (RAM), or another active memory that stores instructions executed by the processing unit 118 that comprise at least one, a plurality, or all of the configuration module 110, the trust analysis module 112 and the access control module 114.

Similarly, the data store 122 can be, for example, a flash memory, hard-disk drive or similar volatile or non-volatile computer-storage media. Accordingly, the processing unit 118 uses the data store 122 and/or the memory 116 to store various data when performing the functions described herein. As shown in FIG. 1, the data store 122 is integrated with the computing system 100. Of course, in other embodiments, the data store 122 can be implemented as a distributed storage that is shared among one or more remote devices such as terminals 102, 104 and the database server 106, and the computing system 100 of the distributed file system.

As user herein, the communication network 108 comprises a computer network hardware, software applications, public communication transmission components such as public telephone switching networks and the like to facilitate packetized or other communications between the computing system 100 and remote devices as described herein. For example, the communication network 108 can comprise a local area network ("LAN"), a wide area network ("WAN"), the Internet, or a combination thereof.

A computer-implemented process of controlling access to a restricted resource by verifying qualifications in compliance with a regulatory security framework is depicted schematically by the flow diagram of FIG. 2. By way of example, the restricted resource can be a secure database storing classified information, personally-identifiable health information; a private computer network; a restricted facility such as a shipping port or other facility where goods are imported to, and exported from a country; a corporate, academic or other facility; any asset to which a candidate would have access, if hired or otherwise assigned to a role; and the like.

According to alternate embodiments, the restricted resource can include a role and/or position within a corporate entity, government organization, or any other organization. For example, the process can be performed by the computing system 100 to verify qualifications as described herein and, in response to successful verification of the qualifications, transmit a signal indicating approval of a candidate for a role or position within an organization. Based at least in part on the approval signal transmitted, the organization can commence the performance of a hiring process that includes onboarding the approved candidate. Examples of the onboarding steps to be performed can include providing the approved candidate with at least one of: an identification card, credentials, a title, responsibilities within the organization, tasks to be performed in the role for which the candidate was approved by the computing system 100, and payroll information.

Access can be granted by verifying qualifications of a candidate for the role or position in question and generating a data structure 120 confirming verification. For example, the data structure 120 can include content that can be used by the computing system 100, one or more of the remote terminals 102, 104, and/or the database server 106 to activate an account in a computer network, generate an access key specific to the candidate to enter a restricted facility, etc. The content can include at least one of: the qualifications that the computing system 100 was able to verify by performing the process described herein, and an indication of a database used to verify such qualifications. Further, access can optionally be granted automatically, without human intervention, in response to successful verification by the computing system 100 as described herein. According to alternate embodiments, the computing system 100 can grant access by generating the data structure 120 verifying information and making that data structure 120 accessible to a personnel manager or other party who, based on the information stored by the data structure 120, manually hires or otherwise assigns the candidate to the role or position in question, or grants the candidate a key card, password, etc. as part of the manual hiring process. As a result, the candidate is granted access to the restricted resource such as the role or position within an organization, and/or other restricted resources such as a remote terminal 102 and/or database server 106, for example, utilized in the performance of the candidate's duties in that role or position.

At block 200 in FIG. 2, the configuration module 110 of the computing system 100 receives a configuration package. The configuration package includes the user-definable settings that allow the user to configure the computing system 100 for the specific verification process to be performed. The configuration package makes the computing system 100 user configurable without modifications at the program code level (i.e., without requiring custom development of the source code). Accordingly, the computing system 100 can be configured to verify a plurality of different qualifications, for different positions, with different trust levels and a different threshold trust for each qualification to be verified. Changes to remote, digital sources or the creation of new roles, for example, can be accommodated through the configuration package.

As shown in FIG. 2, receiving the configuration package can include receiving a qualification set at block 202. The qualification set can include a qualification requested of a successful candidate to gain access to the restricted resource. For example, the qualification can include certification, license, college degree, and/or other such qualifications that are indicative of the candidate's security clearance, skills, background etc. pertinent to accessing and using the restricted resources specific to the role.

At block 204, a threshold trust is received for each qualification eligible for automatic verification, without human intervention. The threshold trust is the minimum level of confidence that the information received by the computing system 100 as proof that the candidate possesses the qualification in question is authentic, true and accurate. If the threshold trust is achieved or exceeded, the qualification can be considered automatically verified without requiring the submission of further information, or human review of the information to bolster the candidate's trust level relative to the threshold trust. If the threshold trust is not exceeded, the computing system 100 can optionally designate one or more of the qualifications as requiring manual human intervention to verify.

Also received as part of the configuration package are a plurality of different sources that could potentially provide information indicative of the qualification, at block 206. For example, the source of information for verifying a candidate's license to operate a passenger or commercial motor vehicle can be a digital source such as a server associated with a Bureau of Motor Vehicles ("BMV"). The computing system 100 can include an application programming interface that establishes communication between the computing system 100 and the server associated with the BMV over the communications network 108. Similarly, the candidate himself/herself can be allowed to act as the source by uploading information under the candidate's control. Other examples of the sources that can be established include, but are not limited to: academic institutions, law enforcement agencies, branches of the military, other branches or offices of the government, certification agencies, any other organization, etc.

At block 208, a different trust level to be assigned to each of the sources can also be received. The trust level establishes a degree to which the respective source is considered trustworthy. For example, as a governmental entity the BMV is considered to be a relatively-high trust source. A sliding scale can be used to rate the trustworthiness of the source. By way of example, scales of 0-10 or 0-100 can be used to rate the trustworthiness of the source, with zero (0) being a rating indicative of the least-trustworthy source and ten (10)

or one hundred (100) representing the most-trustworthy source. Referring once again to the BMV as the source, the BMV can be assigned a trust level of 80, whereas the candidate (without confirmation from an independent source) can be assigned a relatively-low trust level of 15.

With the configuration package received per the user configuration of the computing system 100, the trust analysis module 112 of the computing system 100 receives information indicative of the qualification from one or more of the sources specified in the configuration package at block 210. The trust analysis module 112 associates the information received with the trust level of the source from which the information is received. Referring to the BMV example once again, the information received from a database server 106 associated with the BMV can be assigned the trust level of 80, which was assigned to the BMV above.

At block 212, the access control module 114 generates a data structure 120 (FIG. 1) associated with the candidate. The data structure 120 stores the information received from the source. The data structure 120 and the content thereof control access to the restricted resource. That content includes an indication whether the candidate's qualification is verified. To verify the qualification, the trust analysis module 112 compares: (i) the trust level assigned to the source of the information, to (ii) the threshold trust assigned to that qualification. For example, assume the qualification requiring the candidate to possess a commercial driver's license is assigned a threshold trust of eighty five (85), and the BMV is assigned a trust level of eighty (80). The trust analysis module 112 receives the candidate's commercial driver's license number, and assigns the trust level of eighty (80) to that information. The trust analysis module 112 compares the assigned trust level of eighty (80) to the threshold trust of eighty five (85) required to automatically verify this qualification, and determines that the threshold trust has not been satisfied. Accordingly, the trust analysis module 112 requires additional information to be received and compared to the threshold trust for this qualification.

The additional information can be manual human review and entry of confirmation that the candidate's commercial driver's license is legitimate, and not expired, or any other information from another source. For example, the trust analysis module 112 can receive information about the candidate's insurance policy for a commercial vehicle from an insurance database. Assuming the insurance database is assigned a trust level of twenty five (25), the trust analysis module 112 assigns the value of twenty five (25) to the additional information received. The trust analysis module 112 determines, at block 214, the combined trust level to be the sum of the trust level (80) assigned to the first information received from the BMV server and the trust level (25) assigned to the second information received from the insurance database. This sum, equal to one hundred five (105), is determined at block 214 to exceed the threshold trust (85) required to allow the computing system 100 to automatically verify the qualification of the commercial driver's license for that candidate. As a result, the access control module 114 modifies the data structure 120 to store the automatic verification of the qualification.

If, however, the trust level associated with the information received from the first information received from the BMV server had exceeded the threshold trust required to automatically verify the commercial driver's license, no further information would have been required. Instead, the trust analysis module 112 would have verified the candidate's commercial driver's license without the additional information from the insurance database, and the access control module 114 would have modified the data structure 120 stored in the data store 122.

At block 216, the access control module 114 controls access to the restricted resource by storing the modified data structure 120 in the data store 122, where it is accessible to the remote terminal(s) 102, 104 and/or database server 106 and any other remote device. Such remote device(s) can grant access, or be used by an operator to grant access to any restricted resource as described above based, at least in part, on the qualification being flagged as verified in the data structure 120.

Figure 3:
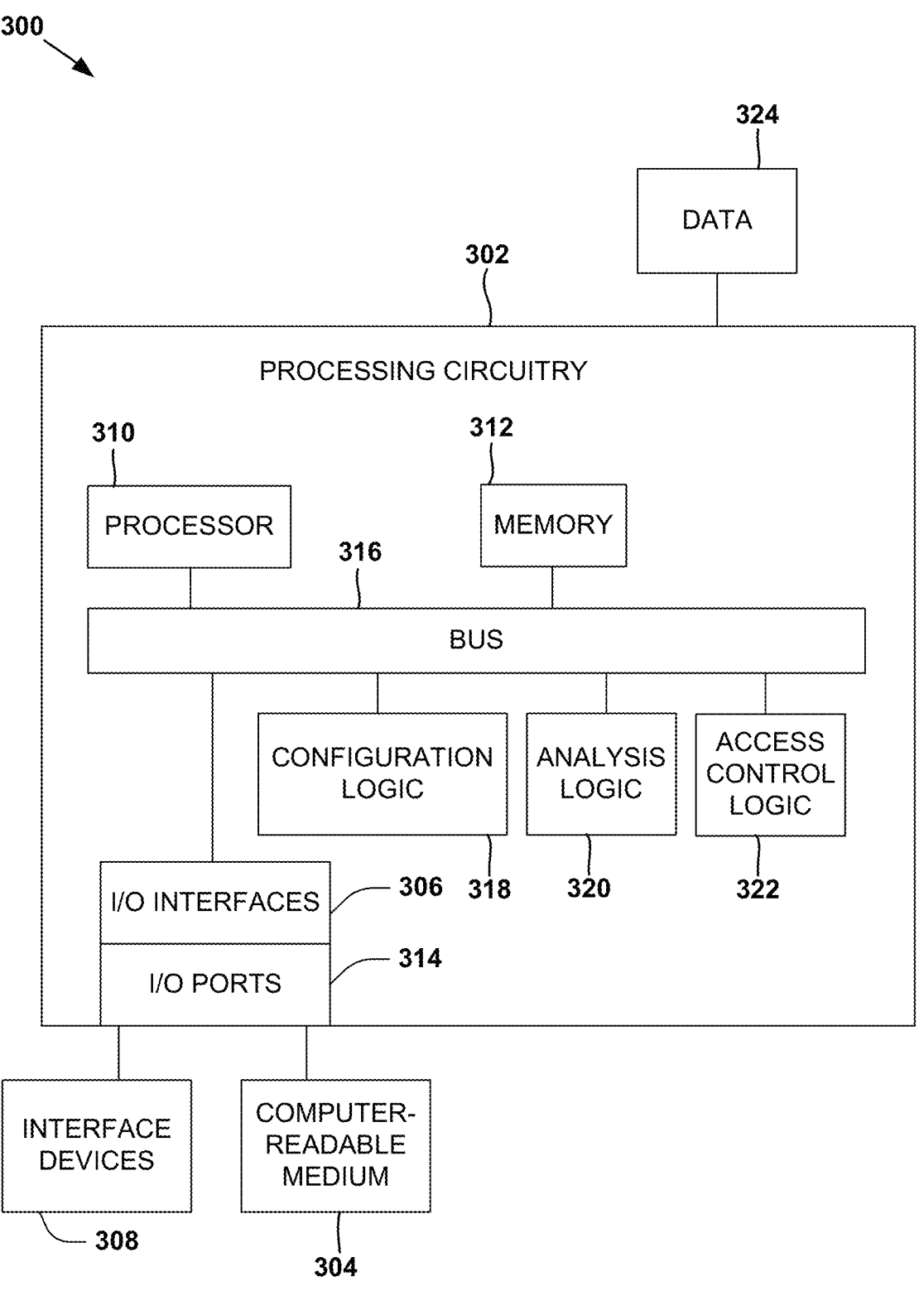
FIG. 3 is an embodiment of a computer implemented as a computing system, including electronic circuitry and a non-transitory, computer-readable medium storing executable logic according to the exemplary systems and/or methods disclosed.

As shown in FIG. 3, that is configured and/or programmed with one or more of the example systems and methods described herein, and/or equivalents. As shown, the computing system 300 includes processing circuitry 302 that is responsive to input instructions corresponding to information from various different sources, to verify qualifications and control access to restricted resources as described herein. For example, the input instructions can be included as a data structure pre-programmed and stored in a non-transitory, computer-readable medium 304; manually input by an operator during operation of the computing device 100 via an interface device 308 such as a keyboard or other user interface, for example; correspond to control signals transmitted by an automated interface device 308 such as one or more sensors to be received by the processing circuitry 302, any combination thereof, or otherwise transmitted to the processing circuitry 302.

As an example, the processing circuitry 302 of the processing unit 118 includes a processor 310, an integrated memory 312, and input/output ports 314 controlled by an input/output (I/O) interface 306 operably connected by a data bus 316. Examples of the processor 310 include, but are not limited to single or multi-processor architectures. The processing circuitry 302 can include configuration logic 318, analysis logic 320, and access control logic 322 that perform the functions of the configuration module 110, the trust analysis module 112 and the access control module, respectively, as described herein. Any logic may be implemented in hardware, a computer-readable medium with stored instructions that are executable by the processor 310, firmware, and/or combinations thereof. While the configuration logic 318, analysis logic 320 and access control logic 322 are illustrated as a hardware component attached to the data bus 316, it is to be appreciated that in other embodiments, each logic block could be implemented in the processor 310, stored in memory 312, or stored in a remote computer-readable medium 304 or other electronic storage device that is separate from, but operatively connected to the processing circuitry 302. For embodiments including the remote computer-readable medium 304, the computer-readable medium 304 may be operably connected to the processing circuitry 302 via, for example, an input/output (I/O) interface (e.g., card, device) 306, which includes one or more of the input/output ports 314.

The processing circuitry 302 described above can be integrated with, and form a portion of the computing system 100. As another example, each logic block and/or the processing circuitry 302 can constitute a means (e.g., structure: hardware; non-transitory, computer-readable medium; firmware; etc.) for performing the actions described herein, and such means can be remotely located, but operatively connected to the computing system 100 via a suitable communication channel. Examples of such embodiments include, but are not limited to processing circuitry 302 configured as a server or other terminal operating in a cloud computing system, such as a smartphone, laptop, desktop, tablet computing device, and so on, that remotely transmits control instructions to the computing system 100 for controlling access to the restricted resource. Such means may be implemented, for example, as an application-specific integrated circuit ("ASIC"), programmed to receive relative or absolute positional data for controlling verification of qualifications and access to restricted resources as described herein. As another example, the means may also be implemented as stored computer-executable instructions that are presented to processing circuitry 302 as data 324 from a remote source over a communication network, that are temporarily stored in memory 312 and then executed by processor 310. Examples of the communication network include, but are not limited to, a local area network ("LAN"), a wide area network ("WAN"), and other networks.

The processing circuitry 302 may interact with one or more of the interface devices 308 via the I/O interfaces 306 and the input/output ports 314. Input/output devices may be, for example, any type of user interface that allows for the manual entry of information or commands. According to some embodiments, examples of the interface devices 308 include, but are not limited to, a keyboard, a microphone, a pointing and selection device, joystick, cameras, video cards, displays, the computer-readable medium 304, other devices operatively connected to the processing circuitry 302 via a communication network, and so on. The input/output ports 314 may include, for example, serial ports, parallel ports, USB ports, wireless communication channels (e.g., Bluetooth radios, IEEE 802.1x compliant radios, etc).

In one or more embodiments, the disclosed methods or their equivalents are performed by either: computer hardware configured to perform the method; or computer instructions embodied in a module stored in computer-readable medium where the instructions are configured as an executable algorithm configured to perform the present processes when executed by at least a processor of the processing circuitry 302.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" and "memory," as used herein, refer to a non-transitory medium that stores instructions and/or data configured to perform one or more of the disclosed functions when executed by at least a processor. Data may function as instructions in some embodiments. A computer-readable medium 304 and memory 312 may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium 304 and memory 312 may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can retrieve and store data and/or instructions. Each type of media, if selected for implementation in one embodiment, may include stored instructions of an algorithm configured to perform one or more of the disclosed and/or claimed functions.

"Logic," as used herein, represents a component that is implemented with computer or electrical hardware (e.g., computer-readable medium 304 and/or memory 312), a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented process of controlling access to a restricted resource by verifying qualifications in compliance with a regulatory security framework, the computer-based implemented process comprising:

receiving, with a cloud-based computing system, a configuration package comprising:

(i) a qualification set comprising a qualification requested of a candidate to gain access to the restricted resource, (ii) a threshold trust for the qualification that is to be established for the qualification to be considered verified, (iii) a plurality of different sources that could potentially provide information indicative of the qualification, and (iv) a different trust level to be assigned to each of the plurality of different sources, wherein trust level establishes a degree to which each of the plurality of different sources is considered trustworthy;

wherein the configuration package is obtained from user selections of the quality sets, the threshold trust, the different sources, and the different trust level to be assigned to each of the plurality of different sources from a menu displayed by the cloud-based computing system;

receiving, with the cloud-based computing system via a digital communication channel, the information indicative of the qualification from a first source included in the plurality of different sources;

generating, with the cloud-based computing system, a data structure associated with the candidate comprising the information received from the first source;

comparing, with the cloud-based computing system, a first trust level assigned to the first source to the threshold trust associated with the qualification;

responsive to a determination that the first trust level does not satisfy the threshold trust, requesting, with the cloud-based computing system via a second digital communication channel, additional information from an external digital source over a communication network, the external digital source being a second source located remotely from the cloud-based computing system, and the second source included in the plurality of different sources;

receiving, with the cloud-based computing system via the second digital communication channel, the additional information indicative of the qualification from the second source;

adding, with the cloud-based computing system, a second trust level assigned to the second source to the first trust level assigned to the first source to generate a combined trust level;

comparing, with the cloud-based computing system, the combined trust level to the threshold trust associated with the qualification; and responsive to a determination that the combined trust level satisfies the trust threshold, modifying the data structure to flag the qualification as being verified without human intervention;

responsive to a determination that the first trust level satisfies the trust threshold, modifying the data structure to flag the qualification as being verified without human intervention; and controlling, with the cloud-based computing system, access to the restricted resource based, at least in part, on the qualification being flagged in the data structure.

2. The computer-implemented process of claim 1 further comprising: responsive to a determination that the first trust level fails to satisfy the trust threshold, modifying the data structure to flag the qualification as requiring supplemental verification before the qualification can be verified.

3. The computer-implemented process of claim 1, wherein the first source and the second source are different digital sources, and the data structure is modified without human intervention to flag the qualification as being verified based on the combined trust level.

4. The computer-implemented process of claim 1, wherein the first source is a digital source and the first trust level is a relatively-high trustworthiness;

the second source is the candidate, and the second trust level is a relatively-low trustworthiness; and the data structure is modified without human intervention to flag the qualification as being verified based on the combined trust level.

\* \* \* \* \*